US012764495B2

(12) United States Patent
Jantzi et al.

(10) Patent No.: US 12,764,495 B2
(45) Date of Patent: Oct. 13, 2026

(54) SYSTEMS AND METHODS FOR ASSET TRACKING WITH GROUPED ASSOCIATED TRACKING DEVICES

(71) Applicant: BlackBerry Limited, Waterloo (CA)

(72) Inventors: Jason Wayne Jantzi, St. Clements (CA); Andrew Kugler, Ottawa (CA); Alexandre Verevkine, Stittsville (CA); Gregory William Somers, Beckwith (CA)

(73) Assignee: BlackBerry Limited, Waterloo (CA)

( * ) Notice: Subject to any disclaimer, the term of this patent is extended or adjusted under 35 U.S.C. 154(b) by 271 days.

(21) Appl. No.: 18/785,105

(22) Filed: Jul. 26, 2024

(65) Prior Publication Data

US 2026/0032405 A1 Jan. 29, 2026

(51) Int. Cl.
*H04W 4/02* (2018.01)
*H04W 4/029* (2018.01)
*H04W 84/20* (2009.01)

(52) U.S. Cl.
CPC ........... *H04W 4/023* (2013.01); *H04W 4/027* (2013.01); *H04W 4/029* (2018.02); *H04W 84/20* (2013.01)

(58) Field of Classification Search
CPC ...... H04W 4/023; H04W 4/029; H04W 4/027
See application file for complete search history.

(56) References Cited

U.S. PATENT DOCUMENTS

| | | | |
|---|---|---|---|
| 5,588,005 | A | 12/1996 | Ali et al. |
| 5,691,980 | A | 11/1997 | Welles, II et al. |
| 10,271,279 | B2 | 4/2019 | Raghavan et al. |
| 2016/0048800 | A1 | 2/2016 | Whitten |
| 2021/0286039 | A1 | 9/2021 | Hergesheimer |

OTHER PUBLICATIONS

European Extended Search Report; Application No. 25173069.3; Sep. 23, 2025; 10 pages.

*Primary Examiner* — Justin Y Lee
(74) *Attorney, Agent, or Firm* — Conley Rose, P.C.; J. Robert Brown, Jr.

(57) ABSTRACT

Methods and system for tracking assets. A server receives, via wireless communication, from each of a plurality of tracking devices, adjacent device data for that tracking device regarding one or more detected nearby tracking devices and an estimated distance measurement to each detected nearby tracking device. The server determines from the adjacent device data that a subset of the plurality of tracking devices are in a group associated with a multi-unit vehicle. The server selects at least one of the tracking devices in the subset as a master device. The other tracking devices in the subset are slave devices. The master device is to send location data to the server via its wireless data connection. The slave devices are to forego sending communications to the server via their respective wireless data connections.

20 Claims, 10 Drawing Sheets

500

500

SYSTEMS AND METHODS FOR ASSET TRACKING WITH GROUPED ASSOCIATED TRACKING DEVICES

FIELD

The present application relates to the field of asset tracking devices, and more specifically, to methods and systems of conserving battery power in asset tracking devices.

BACKGROUND

In order to track assets, tracking devices may be attached to shipping containers, train cars, truck frames, or other items for which a user wishes to track their geographical locations. The tracking devices periodically obtain data connection over a cellular network and transmit a location to a server. Often times, there are multiple tracking devices associated with the same moving unit. For example, there may be a tracking device in each car of a train. Alternatively, each of a truck, chassis, and container in a road shipping unit may have a tracking device. In these situations, having all of these tracking devices transmit location to the server may cause 1) network congestion and latency and delay in server updates; 2) unnecessary consumption of battery lives of the asset tracking devices; 3) the appearance that the same moving unit is in two places (e.g. two tracking devices associated with the same moving unit transmitting location at different times).

There is need for an asset tracking system that preserves bandwidth over a network and avoids unnecessary consumption of battery lives of the tracking devices.

BRIEF DESCRIPTION OF THE DRAWINGS

Reference will now be made, by way of example, to the accompanying drawings which show example embodiments of the present application. In the drawings.

Similar reference numerals may have been used in different figures to denote similar components.

DESCRIPTION OF EXAMPLE EMBODIMENTS

Figure 1:
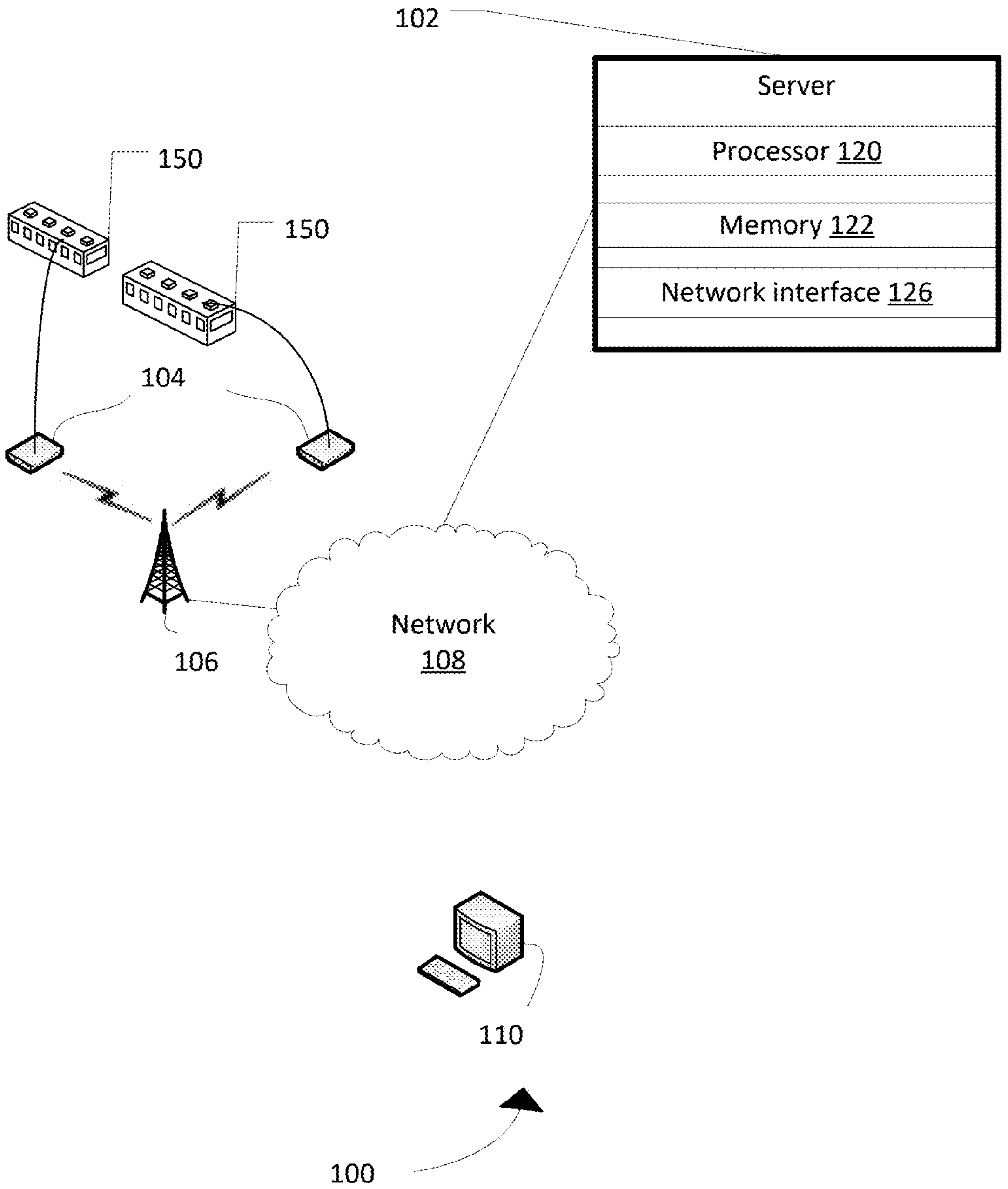
FIG. 1 illustrates an asset tracking system communicating with and monitoring asset tracking devices in various geographical locations.

In one aspect, the present application describes a method for tracking assets. The method comprises: receiving at a server, via wireless communication, from each of a plurality of tracking devices, adjacent device data for that tracking device regarding one or more detected nearby tracking devices and an estimated distance measurement to each detected nearby tracking device; determining from the adjacent device data that a subset of the plurality of tracking devices are in a group associated with a multi-unit vehicle; selecting at least one of the tracking devices in the subset as a master device; and transmitting, via wireless communication, instructions to the subset of tracking devices designating the at least one of the tracking devices as the master device and other tracking devices in the subset as slave devices, wherein the master device is to send location data to the server via its wireless data connection, and wherein the slave devices are to forego sending communications to the server via their respective wireless data connections.

In some implementations, the method further comprises maintaining, for each of the plurality of tracking devices, a list of adjacent devices, and in response to receiving the adjacent device data for that tracking device: determining a subgroup of the one or more nearby tracking devices for that tracking device wherein each of the subgroup has an acceleration that is within an allowed deviation of an acceleration of that tracking device and each of the subgroup are not in the list of adjacent devices for that tracking device; adding each of the subgroup to the list of adjacent devices for that tracking device; and adding that tracking device to the list of adjacent devices for each of the subgroup.

In some implementations, determining from the adjacent device data that the subset of the plurality of tracking devices are in the group further comprises generating a list of connected tracking devices by adding one of the plurality of tracking devices to the list of connected tracking devices and for each of the plurality of tracking devices added to the list of connected tracking devices, recursively: determining, from the list of adjacent devices for that tracking device, a subcollection of tracking devices adjacent to that tracking device that are missing from the list of connected tracking devices; and adding each of the subcollection to the list of connected tracking devices.

In some implementations, the method further comprises: receiving at the server, subsequent to the transmitting, via wireless communication, from each of the plurality of tracking devices, updated adjacent device data for that tracking device regarding one or more detected nearby tracking devices and an updated estimated distance measurement to each detected nearby tracking device; determining from the updated adjacent device data that one of the tracking devices in the subset is not part of the group associated with the multi-unit vehicle; selecting a new master device for the one of the tracking devices; and transmitting, via wireless communication, instructions to the new master device wherein the new master device is to send location data to the server via its wireless data connection.

In some implementations, the method further comprises, for each of the plurality of tracking devices, in response to receiving the updated adjacent device data for that tracking device: determining that one of the tracking devices in the list of adjacent devices for that tracking device has an acceleration beyond the allowed deviation of the acceleration of that tracking device; and responsive thereto, removing the one in the list of adjacent devices for that tracking device from the list of adjacent devices for that tracking device, and removing that tracking device from the list of adjacent devices for the one in the list of adjacent devices for that tracking device.

In some implementations, determining that the one of the tracking devices in the subset is not part of the group associated with the multi-unit vehicle further comprises: generating a list of connected tracking devices by adding one of the plurality of tracking devices to the list of connected tracking devices and for each of the plurality of tracking devices added to the list of connected tracking devices, recursively: determining, from the list of adjacent devices for that tracking device, a subcollection of tracking devices adjacent to that tracking device that are missing from the list of connected tracking devices, and adding each of the subcollection to the list of connected tracking devices; and determining that none of the tracking devices in the group associated with the multi-unit vehicle are in the list of connected tracking devices.

In some implementations, selecting the one of the tracking devices as the new master device further comprises determining that none of the tracking devices in the list of connected tracking devices have been selected as the master.

In some implementations, each of the plurality of tracking devices have a battery and a corresponding battery life, and the at least one master device is selected based on the battery lives of the tracking devices in the subset of the plurality of tracking devices.

In some implementations, the method further comprises determining an order of the tracking devices in the subset based on the estimated distance measurements to each detected nearby tracking device for each of the tracking devices in the subset.

In some implementations, the method further comprises, prior to the receiving at the server, at one or more of the tracking devices in the subset: detecting a trigger event; in response to detecting the trigger event, using a short-range wireless system to detect the one or more detected nearby tracking devices for that tracking device; and determining the estimated distance measurement to each detected nearby tracking device using the short-range wireless system.

In some implementations, the trigger event is a change in acceleration.

In some implementations, the trigger event is an elapse in time.

In another aspect, the present application describes a server for tracking assets. The server is coupled to a wireless communication system. The server comprises a processor and a memory storing processor-executable instructions. When the instructions are executed, they cause the processor to: receive at a server, via wireless communication, from each of a plurality of tracking devices, adjacent device data for that tracking device regarding one or more detected nearby tracking devices and an estimated distance measurement to each detected nearby tracking device; determine from the adjacent device data that a subset of the plurality of tracking devices are in a group associated with a multi-unit vehicle; select at least one of the tracking devices in the subset as a master device; and transmit, via wireless communication, instructions to the subset of tracking devices designating the at least one of the tracking devices as the master device and other tracking devices in the subset as slave devices, wherein the master device is to send location data to the server via its wireless data connection, and wherein the slave devices are to forego sending communications to the server via their respective wireless data connections.

In some implementations, the server maintains, for each of the plurality of tracking devices, a list of adjacent devices, and in response to receiving the adjacent device data for that tracking device, the server: determines a subgroup of the one or more nearby tracking devices for that tracking device wherein each of the subgroup has an acceleration that is within an allowed deviation of an acceleration of that tracking device and each of the subgroup are not in the list of adjacent devices for that tracking device; adds each of the subgroup to the list of adjacent devices for that tracking device; and adds that tracking device to the list of adjacent devices for each of the subgroup.

In some implementations, the server: receives, subsequent to the transmitting, via wireless communication, from each of the plurality of tracking devices, updated adjacent device data for that tracking device regarding one or more detected nearby tracking devices and an updated estimated distance measurement to each detected nearby tracking device; determines from the updated adjacent device data that one of the tracking devices in the subset is not part of the group associated with the multi-unit vehicle; selects the one of the tracking devices as a new master device; and transmits, via wireless communication, instructions to the one of the tracking devices designating the one as the new master device and, wherein the new master device is to send location data to the server via its wireless data connection.

In some implementations, each of the plurality of tracking devices, in response to receiving the updated adjacent data for that tracking device, the server: determines that one of the tracking devices in the list of adjacent devices for that tracking device has an acceleration beyond the allowed deviation of the acceleration of that tracking device; and responsive thereto, removes the one in the list of adjacent devices for that tracking device from the list of adjacent devices for that tracking device, and removes that tracking device from the list of adjacent devices for the one in the list of adjacent devices for that tracking device.

In some implementations, each of the plurality of tracking devices have a battery and a corresponding battery life, and the at least one master device is selected based on the battery lives of the tracking devices in the subset of the plurality of tracking devices.

In some implementations, prior to the receiving at the server, one or more of the tracking devices in the subset: detect a trigger event; in response to detecting the trigger event, use a short-range wireless system to detect the one or more detected nearby tracking devices for that tracking device; and determine the estimated distance measurement to each detected nearby tracking device using the short-range wireless system.

In some implementations, the trigger event is a change in acceleration.

In another aspect, the present application describes a non-transitory computer-readable medium storing processor-executable instructions to: receive at a server, via wireless communication, from each of a plurality of tracking devices, adjacent device data for that tracking device regarding one or more detected nearby tracking devices and an estimated distance measurement to each detected nearby tracking device; determine from the adjacent device data that a subset of the plurality of tracking devices are in a group associated with a multi-unit vehicle; select at least one of the tracking devices in the subset as a master device; and transmit, via wireless communication, instructions to the subset of tracking devices designating the at least one of the tracking devices as the master device and other tracking devices in the subset as slave devices, wherein the master device is to send location data to the server via its wireless data connection, and wherein the slave devices are to forego sending communications to the server via their respective wireless data connections.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application relates to asset tracking devices. These devices may be attached to shipping containers, train cars, truck frames, or other items for which a user wishes to track their geographical location. Asset tracking devices typically contain a global navigation satellite system (GNSS) chip or other such hardware for obtaining location data using satellite signals. The tracking devices are typically battery-powered and may be deployed for long periods of time.

Asset tracking devices typically contain a cellular transceiver that enables them to periodically obtain a data connection over a cellular network and transmit a location report to a central server. The location report may contain one or more geolocation determinations or geolocation data, timestamps for when the data was obtained, and other such information. The central server may provide an interface that enables a registered user account having one or more associated tracking devices to log into the central server to obtain reported information regarding the location or location history of their associated tracking devices.

In some cases, the tracking device is attached to an unpowered asset, such as a trailer, shipping container, chassis, train car, or other such asset, for which a user wishes to track its geographical location. In other cases, the tracking device is attached to a powered vehicle carrying an asset. Examples of such powered vehicles include locomotives and trucks. In other cases, the powered vehicle and the unpowered asset being carried by the powered vehicle may both be coupled to their own tracking device. Using its GNSS chip and/or its cellular transceiver the tracking device may be configured to periodically determine its geographical location. The asset tracking device may further be configured to periodically obtain a data connection to a mobile data network to transmit a location report to a central server, where the location report includes the geographical location data determined by the device from time-to-time.

In accordance with one aspect of the present application, a tracking device may preserve battery power and prevent network congestion by entering a sleep mode or state in which it does not periodically wake up to obtain and report geolocation data if it is in close proximity to another tracking device and both tracking devices are installed on or associated with the same multi-unit vehicle such as a train. That is, when, for example, a first tracking device is installed on a first rail car, a second tracking device is installed on a second rail car, and the first rail car is connected to the second rail car, the first tracking device may go to sleep to preserve battery life and prevent network congestion. During this period, the second tracking device installed on the second rail car obtains geographic location data and thereafter transmits the geographic location data to a server. The first tracking device may be configured to resume normal operation or periodically wake up to obtain and report geolocation data once it detects that it is no longer associated with the second tracking device, or, in other words, the first rail car and the second rail car are no longer moving in unison.

FIG. 1 illustrates an example of an asset tracking system 100. The asset tracking system 100 may include a server 102, a plurality of tracking devices 104 associated with vehicles 150. In FIG. 1, the vehicles 150 are depicted as train cars. In other embodiments, the vehicles 150 may be other rail vehicles. In other embodiments, the vehicles may be road vehicles. In some embodiments, the vehicles 150 may include a container and a chassis.

The server 102 is depicted having at least one processor 120 and a memory 122. The processor 120 may be a central processing unit, a microprocessor, a signal processor, an application-specific integrated circuit (ASIC), a field-programmable gate array (FGPA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 122 may include a volatile or non-volatile memory (e.g., a flash memory, a random access memory (RAM), and/or a read-only memory (ROM)). The memory 122 may be considered a computer-readable storage medium storing computer-executable instructions or a memory storing computer-executable instructions. The memory 122 may store instructions for execution by the processor 120. The memory 122 may be considered coupled to the processor 120.

The server 102 includes at least one network interface 126 for wired or wireless communication with an external system or network (e.g., an intranet, the Internet, a peer-to-peer network, a wide area network (WAN) and/or a local area network (LAN)), and in particular, for communication with the tracking devices 104.

The tracking devices 104 may be in one country or many countries. The tracking devices 104 may be attached to various items, such as tractor trailers, shipping containers, train chassis, truck chassis, shipping pallets, and the like.

The tracking devices 104 may include one or more inertial measurement units (IMUs) for determining if the tracking device 104 is stationary or in motion, such as an accelerometer. The tracking devices 104 may include one or more geolocation determination devices, such as a GNSS chip. The tracking devices 104 may also include a cellular transceiver that enables them to receive signals from one or more nearby cellular towers 106 forming part of a mobile data network. The mobile data networks are interconnected with other data networks, such as the Internet in a computer network 108 to provide for worldwide data connectivity and communications capability. The tracking devices 104 are thus able to send and receive data with the server 102 from any location in the world in which they are able to obtain a cellular data connection through a mobile data network. In some cases, the tracking devices 104 may also include a wireless local-area network chip, such as a Wi-Fi chip set, that enables shorter-range wireless communications access to the computer network 108.

The tracking devices 104 may be configured to operate in a normal operating mode. In some implementations, the tracking devices 104 may be configured to periodically obtain location data and to report location data to the server 102. In some cases, the periodicity may vary depending on whether the tracking device 104 is in motion or stationery. For example, if the tracking device 104 determines, from its IMU that it is not in motion and/or from a comparison of current location data to previous location data that it has not moved, then it may set a longer period of time before its next awakening, such as every 30 minutes, 1 hour, 2 hours, 6 hours, etc. If the tracking device 104 determines, from the IMU and/or from the location data, that it is in motion, then it may set a shorter time period, such as 5 minutes, 10 minutes, 15 minutes, etc.

The periodicity with which the tracking device 104 seeks a cellular data connection and sends a location report may be the same or may be different from the periodicity with which the tracking device 104 obtains location data. In some cases, the reporting may occur less frequently than the location data recordings, particularly if the tracking device 104 is in motion. For instance, if the device obtains location data every 5 minutes, it may be configured to only report the accumulated location data and timestamps every 30 or 60 minutes, to save power.

In some implementations, when the server 102 determines from data receive from the tracking devices 104 that that some of the tracking devices 104 are proximate and moving in unison, the server 102 may select, from those specific tracking devices, a master device. The server 102 may then send instructions, to the other tracking devices among those specific tracking devices, to enter a sleep mode. While in the sleep mode, the tracking device 104 may be configured not to power its GNSS chip and/or cellular transceiver on periodic basis. That is, the tracking device 104 may cease periodically waking up to obtain location data and may remain in a lower-power state until, for example, otherwise instructed by the server.

Owners and operators of the tracking devices 104 may each have an associated user account with the server 102 that enables them to remotely log into, or otherwise connect with, the server 102, such as through an application programming interface via a mobile application or using other such technology.

By way of the user device 110, the user may send and receive communications with the server 102 regarding one or more of the tracking devices 104 associated with the user account, including receiving data regarding the reported location of the tracking devices 104. It will be understood that various authentication and verification processes may be imposed by the server 102 to ensure that data regarding one of the tracking devices 104 is only provided to an authorized user account with which the tracking device 104 is associated.

The server 102 may provide data, including geographical location data, to the user device 110 that enables the user device 110 to output a graphical user interface showing, as an overlay on top of a map rendering, the location of one of the tracking devices 104. The overlay may include a symbol or marker rendered at the location in the graphical user interface on top of the map corresponding to the geographical location last reported by the tracking device 104 in its location reports. In some cases, additional information may be made available for display on the user device 110 by the server 102. Location reports may include information such as latitude and longitude coordinates and data obtained by the tracking device 104 from cellular tower signals that it is able to receive. The cellular data may include, for example, cellular tower identifier (i.e., Cell ID or CID), Radio Access Technology (RAT) such as Global System for Mobile (GSM), Universal Mobile Telecommunications Service (UMTS), Long-Term Evolution (LTE), 5G, etc., cellular band, Received Signal Strength Indicator (RSSI) readings, mobile country code (MCC), Mobile Network Code (MNC), mobile network operator (MNO) identifier, location area code (LAC), and other such data.

In some implementations, the tracking device 104 may include other sensors, such as a temperature sensor, humidity sensor, vibration sensor, or other environmental sensors. That sensor data may be included in one or more of the location reports. In some cases, one or more sensors or other instruments may be contained in a different physical unit from the tracking device 104 and may communicate with the device using a low-power short range communication protocol, such as Bluetooth™ for example.

Figure 2:
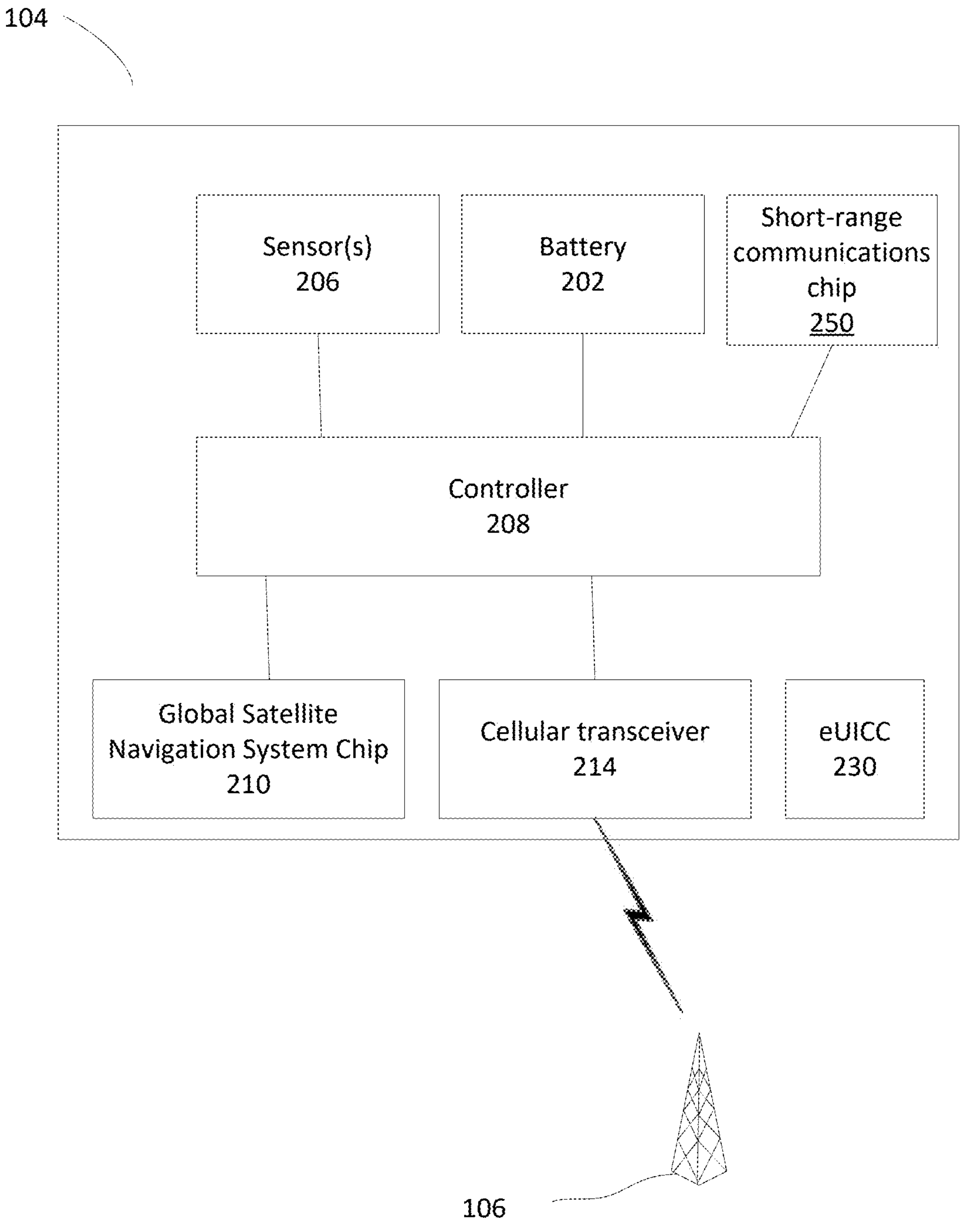
FIG. 2 illustrates a block diagram of a simplified example of an asset tracking device.

Reference is now made to FIG. 2 which shows, in block diagram form, one simplified example of the tracking device 104. The tracking device 104 may include one or more batteries 202 to power the tracking device 104. Battery 202 may be rechargeable or replaceable in some implementations, and the tracking device 104 may further include battery charging circuitry (not shown) to receive charge from an external power source.

The tracking device 104 in this example contains one or more sensors 206, a controller 208, a GNSS chip 210, a cellular signal transceiver 214, and a short-range communication system, which in this example is a short-range communications chip 250. The one or more sensors 206 may include environmental sensors, such as IMUs, temperature sensors, humidity sensors, dust sensors, chemical sensors, etc. In some cases, the one or more sensors 206 may include load-detection sensors for determining whether a container is loaded on a chassis or the quantity of a load on a chassis. Load-detection sensors may include a millimeter wave radar sensor, a range detector, strain gauge, switch, laser, Hall effect sensor, Time-of-Flight sensor, Reid switch, etc.

The controller 208 may, in some embodiments, be a microprocessor that may be coupled to memory (not pictured). In some cases, the controller 208 may be a microcontroller, an application-specific integrated circuit (ASIC), or another such processing unit. The controller 208 may include a timer and may be configured to awaken from a sleep mode based on the timer. The controller 208 may be configured to determine when to power up the GNSS chip 210 and/or cellular signal transceiver 214, and to obtain and store in memory location data and other data from either the GNSS chip 210 or the cellular signal transceiver 214. The controller 208 may control the cellular signal transceiver 214 and cause it to obtain a data connection with a cellular tower 106 to connect to a mobile network and to send and receive data with the central server (not shown).

The GNSS chip 210 receives location data from a plurality of satellites. The GNSS chip 210 may operate in accordance with one or more satellite location determination protocols, such as the Global Positioning System (GPS), Global Navigation Satellite System (GLONASS), BeiDou Navigation Satellite System, Galileo Satellite Navigation System, Indian Regional Navigation Satellite System (IRNSS)/NavIC, or others. The GNSS chip 210 may be configured to determine, based on received satellite signals from three or more satellites, and output a set of geographic coordinates representing the geolocation of the tracking device 104.

The cellular signal transceiver 214 receives data from signals broadcast by a plurality of cellular towers 106. This data may include cellular tower identifiers, mobile network identifiers, mobile operator identifiers, timestamps, received signal strength measurements, and other such data. The tracking device 104 or the central server (not shown) may be configured to determine a geolocation from the data using cellular triangulation.

The short-range communications chip 250 may include one or more short-range communications technologies, such as Wi-Fi, Bluetooth™, low-power wide-area network (LP-WAN) technology, or other such technologies. In some cases, the short-range communications chip 250 may be used by the tracking device 104 to connect with and exchange communications with a nearby sensor unit or other peripheral related to the tracking device 104. In the examples described below, the short-range communications chip 250 may be used to detect other tracking devices.

The geolocation data, cellular data, sensor data, and other data collected by the controller 208 may be saved in memory on the tracking device 104 together with a timestamp. The controller 208 may then cause the systems of the tracking device 104 to re-enter a sleep mode until next triggered by the timer and/or the IMU. When the controller 208 determines that a location report is to be sent to the central server, it may cause the cellular signal transceiver 214 to establish a wireless data connection with a mobile network, and to transmit a message to the server containing the location report that includes stored data, such as geolocation data, cellular data, sensor data, and other data.

Referring still to FIG. 1 and FIG. 2, the server 102 may include memory 122 that stores data relating to the tracking devices 104. The memory 122 may further store data regarding user accounts and related authentication data and associations between user accounts and specific tracking devices 104. In some implementations, the memory 122 may only store a certain number or time periods of most recent geolocation data so as to avoid excessive memory consumption, such as the past six or twelve months, for instance.

The tracking device 104, in some embodiments, may include an eSIM or eUICC 230 (embedded universal integrated circuit card) configured to permit the storage of more than one network profile and the remote provisioning of a network profile (e.g., mobile network credentials) in an over-the-air wireless provisioning operation. The eUICC 230 provides the cellular signal transceiver 214 with the network credentials for enabling establishment of a data connection with a particular mobile network operator. The credentials are associated with a mobile network plan governing the access to which the tracking device 104 is entitled to the mobile network and the billing plan associated with network communications by the tracking device 104.

Figure 3:
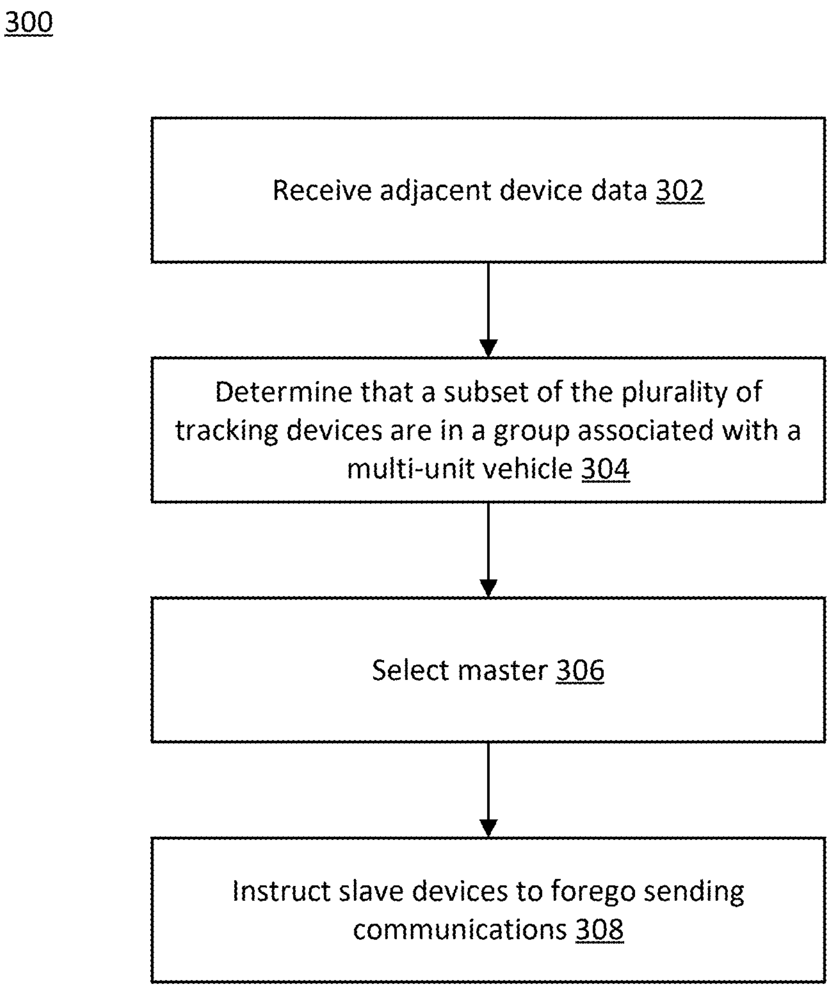
FIG. 3 illustrates a flowchart of a general method of causing tracking devices to forego transmitting location to a server.

Reference is now made to FIG. 3 showing one simplified example method 300 of causing tracking devices to forego transmitting location to a server. The method 300 may be implemented by way of software instructions executed by one or more processors, such as a processor of the server 102 (FIG. 1). The server that implements the method 300 includes at least a processor, a memory, and a network interface.

In operation 302, the server receives adjacent device data from each of a plurality of tracking devices. The tracking devices may be the tracking devices 104 (FIGS. 1 and 2). The server may receive the adjacent device data via wireless communication. For each of the plurality of tracking devices, the adjacent device data may regard one or more detected nearby tracking devices and an estimated distance measurement to each detected nearby tracking device. For example, in the case that a first and second tracking devices are respectively installed on or associated with a first and second rail car, the second rail car following the first rail car, the adjacent device data from the first tracking device may indicate that the second tracking device is adjacent to it. Likewise, the adjacent device data from the second tracking device may indicate that the first tracking device is adjacent to it. Further, the server may receive distance estimates from the first and second tracking devices. That is, the server may receive, from the first tracking device, a distance estimate between the first and second tracking devices, as measured by the first tracking device, and the server may also receive, from the second tracking device, a distance estimate between the first and second tracking devices, as measured by the second tracking device. In some embodiments, the tracking devices estimate distance to other tracking devices based on signal strength. For example, a first tracking device may estimate that it is closer to a second tracking device than a third tracking device if the first tracking device receives a stronger signal from the second tracking device than the third tracking device.

In some embodiments, the adjacent device data may include data regarding tracking devices that are installed on or associated with a vehicle that is proximate but not necessarily adjacent in the conventional sense. For example, in the case that a first, second, and third tracking device are each respectively installed on or associated with a first, second, and third rail car wherein the second rail car follows the first and the third follows the second, the adjacent device data received from the first tracking device may regard the third tracking device.

The tracking devices may detect one or more nearby tracking devices via channel sounding techniques implemented using short-range radio frequency (SRF), Bluetooth™ low energy (BLE), or Bluetooth™ communication. The tracking device may use the short-range communications chip 250 (FIG. 2) as part of its implementation of channel sounding.

In some embodiments, the operation 302 may be initiated by a trigger event. For example, the tracking devices may detect a change in acceleration or velocity. In other embodiments, the operation 302 may be initiated by an elapse in time. For example, a tracking device may periodically transmit adjacent device data to the server. In another embodiment, the server may transmit instructions to the plurality of tracking devices to send adjacent device data after an elapse of time, for example, 10 minutes.

In operation 304, the server determines that a subset of the plurality of tracking devices are in a group associated with a multi-unit vehicle. The server may make the determination based on the adjacent device data received from the plurality of tracking devices. For example, in the case that a first, second, and third tracking device are each respectively installed on or associated with a first, second, and third rail car wherein the second rail car follows the and the third rail car follows the second, the server may determine that the first, second, and third tracking devices are associated with the same train or travelling unit. In another example, wherein a first subset of tracking devices are each installed on rail cars of a first train and a second subset of tracking devices are each installed on rail cars of a second train, the server may associate the first subset with the first train and the second subset with the second train.

In some embodiments, the server may determine an order of the tracking devices in the subset based on the estimated distance measurements to each detected nearby tracking device for each of the tracking devices in the subset. That is, the server may sort the tracking devices in the subset based on the estimated distance measurements.

In some embodiments, the server may consider the estimated distance measurements received from the plurality of tracking devices to determine the subset of the plurality of tracking devices that are in a group associated with a multi-unit vehicle. For example, in the case that the server receives data indicating that a first tracking device is approximately 15 meters away from a second tracking device, the first tracking device is approximately 30 meters away from a third tracking device, the second tracking device is approximately 15 meters away from the third tracking device, and the third tracking device is approximately 60 meters away from a fourth tracking device, the server may determine that the first, second, and third tracking devices are in a group associated with a first train and the fourth tracking device is associated with another train.

Additionally or alternatively, the server may consider acceleration data to determine the subset of the plurality of tracking devices that are in a group associated with a multi-unit vehicle. Continuing the last example, upon determining that the first, second, and third tracking devices are in a group associated with a first train, the server may confirm that the first, second, and third tracking devices have relatively similar acceleration. That is, the second and third tracking device have accelerations that are within an allowed deviation of the acceleration of the first tracking device. In some embodiments, the server may request acceleration data from the tracking devices in order to make the confirmation. In other embodiments, the tracking devices may transmit acceleration data to the server along with the adjacent device data or the acceleration data is included in the adjacent device data.

In some embodiments, the server may maintain, for each of the plurality of tracking devices, a list of adjacent devices. In some embodiments, these lists of adjacent devices may be stored in internal storage of the server. In other embodiments, these lists may be stored in a database such as an SQL database. In another embodiment, a run-time set of lists of adjacent devices may be stored in memory of the server and a more permanent set of lists of adjacent devices may be stored in an external database. The server may retrieve the set of lists of adjacent devices from the external database during run-time and save any changes or amendments to the set of lists to the external database. The server may update these lists in response to receiving adjacent device data. For example, upon receiving adjacent device data from a first tracking device, the adjacent device data indicating that the first tracking device is adjacent to a second and third tracking device, the server may update the list of adjacent devices for the first tracking device to include the second and third tracking devices. The server may also update the list of adjacent devices for the second tracking device to include the first device and similarly update the list of adjacent devices for the third tracking device. That is, the server may, in response to receiving the adjacent device data for a tracking device, determine a subgroup of one or more nearby tracking devices for that tracking device wherein each of the subgroup has an acceleration that is within an allowed deviation of an acceleration of that tracking device and each of the subgroup are not in the list of adjacent devices for that tracking device, add each of the subgroup to the list of adjacent devices for that tracking device, and add that tracking device to the list of adjacent devices for each of the subgroup. The lists of adjacent devices may be considered a representation of an undirected graph wherein the nodes represent tracking devices and the edges represent adjacency of tracking devices.

In some embodiments, the lists of adjacent devices may be implemented using a hash table. For example, each tracking device may have a device ID. The device ID may be hashed to obtain a hash. The hash may then be mapped to a list of device IDs of other tracking devices, the other tracking devices being the adjacent tracking devices.

In some embodiments, the server may, prior to determining that the subset of tracking devices are part of a group associated with a multi-unit vehicle, confirm that the subset of tracking devices are all in a common geofence. For example, in the case that a first to third tracking device, associated with respective first to third rail cars, are proximate and have similar accelerations but the third tracking device is not in a geofence that the first and second tracking device are inside, the server may determine that the first and second tracking devices are part of the group associated with a multi-unit vehicle whereas the third tracking device is not.

In operation 306, the server selects at least one of the tracking devices in the subset associated with a multi-unit vehicle as a master device. For example, in the case that a first and second tracking device are respectively installed on a first and second rail car of a train, the server may determine that the first tracking device is the master device. In some implementations, that server may select the at least one master based on some criteria. For example, the tracking devices may have batteries and corresponding battery lives. The server may select the at least one master device based on the battery lives of the tracking devices in the subset of the plurality of tracking devices. For example, if the first tracking device has a longer remaining battery life than the second tracking device, the server may select the first tracking device as the master. In other embodiments, criteria for selecting a master may include signal or network strength between the tracking devices and the server. For example, if the second tracking device has a stronger network connection with the server than the first tracking device, the server may select the second tracking device as the master device. In some embodiments, the server may select the at least one master device based on both remaining battery life and network connection strength. For example, the server may select, from a group of tracking devices with a network connection strength with the server exceeding a threshold, the tracking device with the longest expected remaining battery life as the master device.

In some embodiments, the server may select multiple tracking devices from the subset of tracking devices associated with the multi-unit vehicle as master devices. For example, in the case that the tracking devices are each installed on a train with at least 200 connected rail cars, the server may select master devices such that there is a master device for each 50 unit rail car segment. That is, there is a master device among the first to fiftieth tracking device, there is a master device among the fifty-first to one hundredth tracking device, et cetera.

In some embodiments, prior to the initiation of the method 300, that is before the operation 302 executes, all of the plurality of devices may be a master device.

In operation 308, the server transmits, via wireless communication, instructions to the subset of tracking devices designating the at least one of the tracking devices as the master device and other tracking devices in the subset as slave devices, wherein the master device is to send location data to the server via its wireless data connection, and wherein the slave devices are to forego sending communications to the server via their respective wireless data connections. For example, in the case that the server selects a first tracking device among a first to fifth tracking devices as the master, the server sends instructions to the second to fifth tracking devices designating them to be non-master or slave devices. Consequently, the second to fifth tracking devices may forego sending any location data to the server. Additionally or alternatively, the second to fifth tracking device may enter a sleep mode. In some implementations, while the asset tracking device is in sleep mode, the cellular transceiver or modem may be placed in a power-saving mode (PSM) or e-DRX mode Extended Discontinuous Reception. In another example, the server may directly send instructions to the second to fifth tracking devices to forego sending location to the server until otherwise instructed. In some examples, the first tracking device may receive instructions designating it as the master and to periodically send location data to the server. In other examples, the server may not send any instructions to the first tracking device and the first tracking device may continue to periodically send location data to the server. That is, the first tracking device does not change its mode of operation.

Causing some tracking devices to forego transmitting location data to the server allows for more efficient conservation of the battery lives of the tracking devices and prevents network congestion.

In some embodiments, after some time, for example 15 minutes, has elapsed after the operation 308, the subset of tracking devices may create a mesh network using their short-range communications systems. Data and information that may be transmitted via this mesh network among the tracking devices includes without limitation health and maintenance data of the tracking device, health and maintenance data of the transportation vehicle associated with the tracking device (e.g. chassis, rail car, etc.), goods carried by the transportation vehicle associated with the tracking device, hazardousness of goods carried by the transportation vehicle associated with the tracking device, fragility of goods carried by the transportation vehicle associated with the tracking device, types of goods that would increase danger risk if carried or transported near or proximate the goods being carried by the transportation vehicle associated with the tracking device (e.g. fireworks and gasoline). In some embodiments, the server may request data pertaining to a particular tracking device or particular assets or transportation vehicle associated with the tracking device. The particular tracking device may transmit the requested data to the master device via a short-range communications system and then the master device may relay the requested data to the server via wireless communication.

In some embodiments, the tracking devices may store in their memory a master list that indicates the corresponding master device for the tracking device. In the case that a mesh network is set up, the master list may also indicate the communication route that the tracking device can use to communicate with its master device. In some embodiments, a particular tracking device may need to communicate with the server because, for example, the transportation vehicle, such as a rail car, associated with the tracking device reached a threshold level with regard to a sensor. For example, a container may have an associated temperature sensor that reaches a maximum or minimum threshold level, triggering an alarm condition that the tracking device relays to the master device for reporting to the server. The particular tracking device may transmit the relevant information to its master device via the mesh network and the master device may relay the information to the server via wireless communication.

In some embodiments, a tracking device may be its own master device.

Figure 4A:
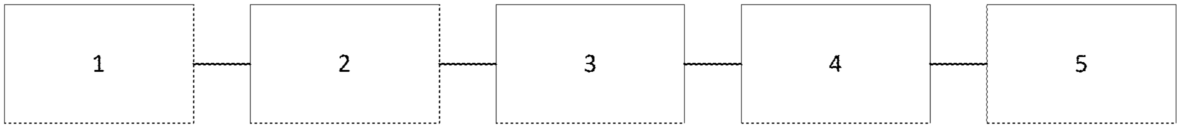
FIGS. 4A-4C are illustrations of an example method of recording adjacent tracking devices.
Figure 4B:
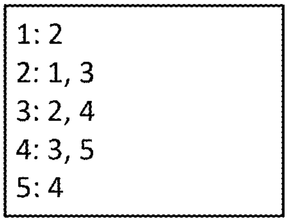
Figure 4C:
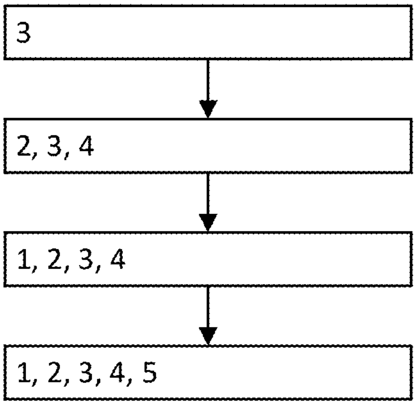

Reference is now made to FIGS. 4A-4C which are illustrations of an example method of recording adjacent tracking devices. FIGS. 4A-4C may be considered an illustrative depiction of processes, applications, algorithms, or instructions stored in memory and executed by the server during the operation 304 of the method 300 (FIG. 3).

FIG. 4A is a simplified diagram of a train with five rail cars, each rail car having a tracking device installed on or associated with it. Each tracking device may be identified as the first, second, third, fourth, or fifth tracking device.

FIG. 4B is a diagram illustrating an example embodiment of lists of adjacent devices corresponding to the train illustrated in FIG. 4A. The lists depicted in FIG. 4B may be stored in internal storage or memory of the server or in an external database such as an SQL database. FIG. 4B shows that the list of adjacent devices for the first tracking device records the second tracking device as an adjacent device. Likewise, FIG. 4B shows that the list of adjacent devices for the second tracking device records the first and third tracking devices as adjacent devices, the list of adjacent devices for the third tracking device records the second and fourth tracking devices as adjacent devices, the list of adjacent devices for the fourth tracking device records the third and fifth tracking devices as adjacent devices, and the list of adjacent devices for the fifth tracking device records the fourth tracking device as an adjacent device.

FIG. 4C shows the server generating a list of connected tracking devices to determine from the adjacent device data that the subset of the plurality of tracking devices are in the group associated with the multi-unit vehicle. The server may generate the list of connected tracking devices by adding one of the plurality of tracking devices to the list of connected tracking devices and for each of the plurality of tracking devices added to the list of connected tracking devices, recursively, determining, from the list of adjacent devices for that tracking device, a subcollection of tracking devices adjacent to that tracking device that are missing from the list of connected tracking devices, and adding each of the subcollection to the list of connected tracking devices.

In the embodiment shown in FIG. 4C, the server starts generating the list by adding the third tracking device to the list of connected tracking devices. The server then traverses the list of adjacent devices for the third tracking device (FIG. 4B) and adds the second and fourth tracking device to the list of connected tracking devices. The server then traverses the list of adjacent devices for the second tracking device (FIG. 4B) and adds the first tracking device to the list of connected tracking devices. The server then traverses the list of adjacent devices for the fourth adjacent device (FIG. 4B) and adds the fifth tracking device to the list of connected tracking devices.

While not explicitly illustrated in FIG. 4C, following the addition of the first tracking device to the list of connected tracking devices, the server may traverse the list of adjacent devices for the first tracking device and not add any tracking devices to the list of connected tracking devices because the second tracking device is already accounted for. Likewise, the server may traverse the list of adjacent devices for the fifth tracking device and not add any tracking devices because the fourth tracking device is already accounted for.

While FIG. 4C illustrates beginning the process of generating the list of connected tracking devices by adding the third tracking device to the list, the process may begin by adding any other tracking device such as the first or second tracking device.

While FIG. 4C illustrates a depth-first-search implementation for generating the list of connected tracking devices, in other embodiments, the server may use other types of graph traversal algorithms, such as breadth-first-search, to implement the generation of the list of connected tracking devices.

Figure 5:
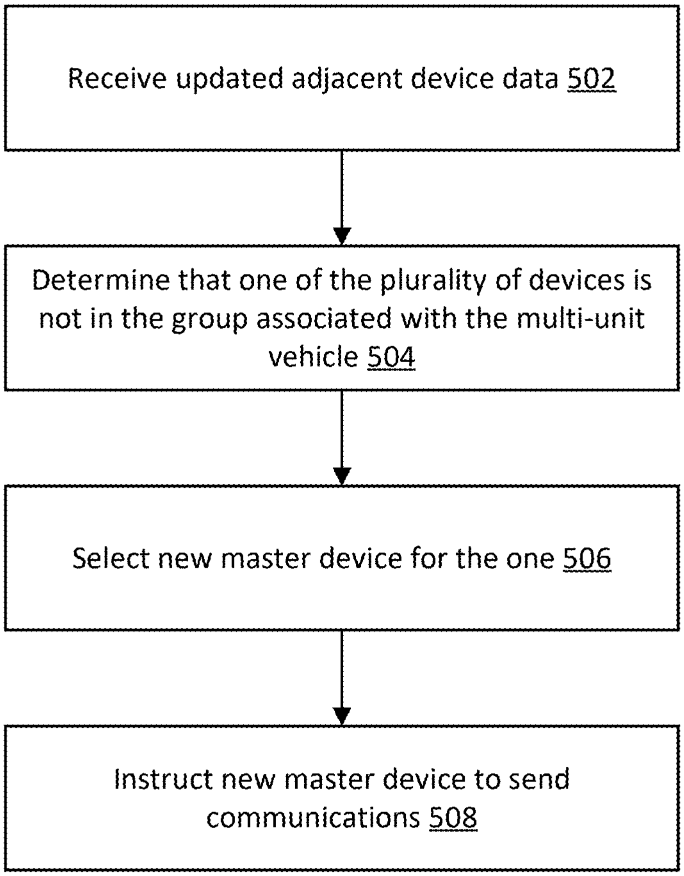
FIG. 5 illustrates a flowchart of a general method of updating the tracking devices that are forgoing transmitting location to the server.

Reference is now made to FIG. 5 showing one simplified example method 500 of updating the tracking devices that are forgoing transmitting location to the server. The method 500 may be implemented by way of software instructions executed by one or more processors, such as a processor of the server 102 (FIG. 1). The server that implements the method 300 includes at least a processor, a memory, and a network interface.

For the execution of the method 500, it is assumed that the server has previously executed a method such as the method 300 (FIG. 3). In particular, the server has designated master devices that transmit location data to the server and slave devices that forgo transmitting location data to the server. In other words, the method 500 may be executed subsequent to transmitting, via wireless communication, instructions to the subset of tracking devices designating the at least one of the tracking devices as the master device and other tracking devices in the subset as slave devices, wherein the master device is to send location data to the server via its wireless data connection, and wherein the slave devices are to forego sending communications to the server via their respective wireless data connections.

In operation 502, the server receives updated adjacent device data from each of a plurality of tracking devices. The tracking devices may be the tracking devices 104 (FIGS. 1 and 2). The server may receive the updated adjacent device data via wireless communication. For each of the plurality of tracking devices, the updated adjacent device data may include one or more detected nearby tracking devices and an estimated distance measurement to each detected nearby tracking device. For example, in the case that a first and second tracking devices are respectively installed on or associated with a first and second rail car, the second rail car following the first rail car, the updated adjacent device data from the first tracking device may indicate that the second tracking device is adjacent to it. Likewise, the adjacent device data from the second tracking device may indicate that the first tracking device is adjacent to it. Further, the server may receive updated distance estimates from the first and second tracking devices. That is, the server may receive, from the first tracking device, an updated distance estimate between the first and second tracking devices, as measured by the first tracking device, and the server may also receive, from the second tracking device, an updated distance estimate between the first and second tracking devices, as measured by the second tracking device.

In some embodiments, the updated adjacent device data may include data regarding tracking devices that are installed on or associated with a vehicle that is proximate but not necessarily adjacent in the conventional sense. For example, in the case that a first, second, and third tracking device are each respectively installed on or associated with a first, second, and third rail car wherein the second rail car follows the first and the third follows the second, the updated adjacent device data received from the first tracking device may regard the third tracking device.

The tracking devices may detect one or more nearby tracking devices via channel sounding techniques implemented using SRF, BLE, or Bluetooth™ communication. The tracking device may use the short-range communications chip 250 (FIG. 2) as part of its implementation of channel sounding.

In some embodiments, the operation 502 may be initiated by a trigger event. For example, the tracking devices may detect a change in acceleration or velocity. In other embodiments, the operation 502 may be initiated by an elapse in time. For example, a tracking device may periodically transmit updated adjacent device data to the server. In another embodiment, the server may transmit instructions to the plurality of tracking devices to send updated adjacent device data after an elapse of time, for example, 10 minutes.

In operation 504, the server determines that one of the plurality of devices is not in the group associated with the multi-unit vehicle. The server may make the determination based on the updated adjacent device data received from the plurality of tracking devices. For example, in the case that a first rail car separates from a former unit of a first to fourth rail car, the server may determine that the respective first tracking device is no longer part of the group that was previously comprised of the respective first to fourth tracking devices. In another example wherein a train is disconnected into a first and second train, the server may determine that the tracking devices installed on or associated with the rail cars of the first train are no longer associated with the tracking device installed on or associated with the rail cars of the second train.

In some embodiments, the server may consider the updated estimated distance measurements received from the plurality of tracking devices to determine that a tracking device is no longer part of the group associated with the multi-unit vehicle. For example, the server may determine that a first tracking device installed on or associated with a first rail car is no longer part of a train of connected rail cars if the closest formerly connected rail car is 30 meters away or father.

Additionally or alternatively, the server may consider acceleration or velocity data to determine that a tracking device is no longer in the group associated with the multi-unit vehicle. For example, a first tracking device of a first rail car may have a velocity in a different direction relative to the tracking devices of the other rail cars associated with the multi-unit vehicle the first rail car was previously considered to be a part of. In another example, a first tracking device of a first rail car may have significantly different acceleration relative to the tracking devices of the other rail cars of the multi-unit vehicle the first rail car was previously considered to be a part of. In some embodiments, the server may request acceleration data from the tracking devices. In other embodiments, the tracking devices may transmit acceleration data to the server along with the updated adjacent device data or the acceleration data is included in the updated adjacent device data.

In some embodiments, the server may maintain, for each of the plurality of tracking devices, a list of adjacent devices. In some embodiments, these lists of adjacent devices may be stored in internal storage of the server. In other embodiments, these lists may be stored in a database such as an SQL database. The server may update these lists in response to receiving updated adjacent device data. For example, a current maintained list of adjacent devices for a first tracking device may include a second tracking device and a third tracking device. Upon receiving updated adjacent device data from the first tracking device, the server may determine that the first tracking device is not adjacent to the third tracking device but remains adjacent to the second tracking device. The server may then remove the third tracking device from the list of adjacent devices for the first tracking device and vice versa. That is, the server may, in response to receiving the updated adjacent device data for a tracking device, determine that one of the tracking devices in the list of adjacent devices for that tracking device has an acceleration beyond the allowed deviation of the acceleration of that tracking device, and responsive thereto, remove the one in the list of adjacent devices for that tracking device from the list of adjacent devices for that tracking device, and remove that tracking device from the list of adjacent devices for the one in the list of adjacent devices for that tracking device.

In operation 506, the server selects a new master device for the one of the tracking devices that is no longer in the group associated with the multi-unit vehicle. In some embodiments, the server may select the one as the master device for itself. For example, if a first tracking device is no longer part of the group associated with the multi-unit vehicle, the server may select the first tracking device as the master device. In another embodiment, the server may determine a list or collection of tracking devices that are connected to the one of the tracking devices If one of the connected tracking devices is already designated as the master, the server may not designate another device, including the one of the tracking devices no longer in the group associated with the multi-unit vehicle, as the master device. That is, the server may make no selection and continue to receive location data from the current master. If there is no master among the devices connected to the one of the tracking devices, the server may then select a master from the connected tracking devices, including the one, based on criteria. Criteria may include battery life and network connection strength. In another embodiment, the server may make a master selection based on criteria regardless of whether there is already a designated master and then reassign the currently designated master to be a non-master or slave device. In a specific wherein a train separates into a first train comprising a first plurality of first rail cars and a second train comprising a second plurality of second rail cars, the server may receive updated adjacent device data from one of the first rail cars. The received updated adjacent device data may indicate that the one of the first rail cars is no longer adjacent to one of the second rail cars that it was previously adjacent to. The server may then determine that the second train is part of the group associated with the multi-unit vehicle (because, for example, it is longer than the first train). The server may then identify the tracking devices installed on or associated with the first rail cars that have a satisfactory network connection with the server; that is, the network connection strength exceeds a threshold. Among these identified tracking devices, the server may select the one with the longest expected remaining battery life to be the master device for the first train. In this specific example, the first train would be another multi-unit vehicle separate from the second train; that is, the tracking devices installed on or associated with the first rail cars are part of a group associated with another multi-unit vehicle separate from the second train.

In operation 508, the server transmits, via wireless communication, instructions to the new master device wherein the new master device is to send location data to the server via its wireless data connection. If a former master device was reassigned to be a non-master or slave device, the server may also transmit instructions to that former master device to forego transmitting location data to the server. Additionally or alternatively, the former master device may enter a sleep mode.

In some embodiments, after some time, for example 15 minutes, has elapsed after the operation 508, the subset of tracking devices may create or update a mesh network using their short-range communications systems. For example, if a particular tracking device is determined not to be part of the subset of tracking devices that are part of the group associated with the multi-unit vehicle, the particular tracking device may be excluded from the mesh network. In another example, if a train separates into a first train and second train, what was one mesh network may split into two mesh networks corresponding to the tracking devices installed on or associated with the first train and the tracking devices installed on or associated with the second train. Data and information that may be transmitted via this mesh network among the tracking devices includes without limitation health and maintenance data of the tracking device, health and maintenance data of the transportation vehicle associated with the tracking device (e.g. chassis, rail car, etc.), goods carried by the transportation vehicle associated with the tracking device, hazardousness of goods carried by the transportation vehicle associated with the tracking device, fragility of goods carried by the transportation vehicle associated with the tracking device, types of goods that would increase danger risk if carried or transported near or proximate the goods being carried by the transportation vehicle associated with the tracking device (e.g. fireworks and gasoline). In some embodiments, the server may request data pertaining to a particular tracking device or particular assets or transportation vehicle associated with the tracking device. The particular tracking device may transmit the requested data to the master device via a short-range communications system and then the master device may relay the requested data to the server via wireless communication.

Figure 6A:
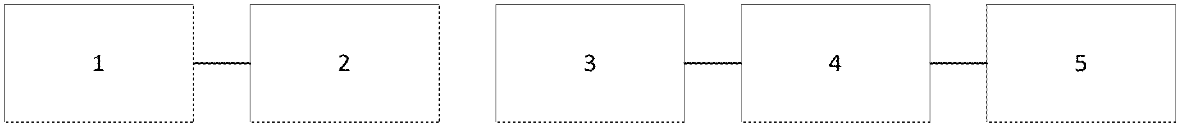
FIG. 6A-6C are illustrations of an example method of updating a record of adjacent tracking devices.
Figure 6B:
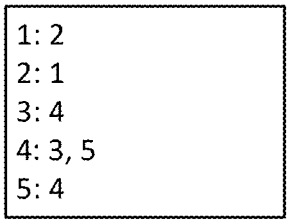
Figure 6C:
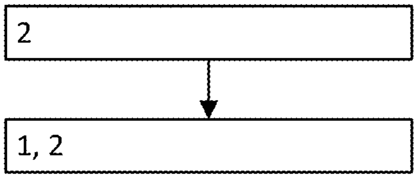

Reference is now made to FIGS. 6A-6C which are illustrations of an example method of recording adjacent tracking devices. FIGS. 4A-4C may be considered an illustrative depiction of processes, applications, algorithms, or instructions stored in memory and executed by the server during the operation 504 of the method 500 (FIG. 5). That is, FIGS. 6A-6C illustrate a situation wherein tracking devices that were formerly considered adjacent are no longer considered adjacent. Similar to how the method 500 (FIG. 5) may be a method executed subsequent the method 300 (FIG. 3), FIGS. 6A-6C may be interpreted to illustrate a situation subsequent to FIGS. 4A-4C. In particular, FIG. 4A may be considered a previous state to FIG. 6A and FIG. 4B may be considered a previous state to FIG. 6B.

FIG. 6A is a simplified diagram of a train with five rails cars that split into two trains: a first train with a first and second rail car, and a second train with a third to fifth rail car. Each rail car may be considered to have a corresponding tracking device. Each tracking device may be identified as the first, second, third, fourth, or fifth tracking device.

FIG. 6B is a diagram illustrating an example embodiment of list of adjacent devices corresponding to the trains illustrated in FIG. 6A. The lists depicted in FIG. 6B may be stored in internal storage or memory of the server or in an external database such as an SQL database. FIG. 4B shows that the list of adjacent devices for the first tracking device records the second tracking device as an adjacent device and vice versa. FIG. 6B also shows that the list of adjacent devices for the third tracking device records the fourth tracking device as an adjacent device, the list of adjacent devices for the fourth tracking device records the third and fifth tracking devices as adjacent devices, and the list of adjacent devices for the fifth tracking device records the fourth tracking device as an adjacent device.

FIG. 6C shows the server generating a list of connected tracking devices for the second tracking device. The server may generate the list in response to a change in the list of adjacent devices for the second tracking device (for example, a change from FIG. 4B to FIG. 6B). The server may generate the list of connected tracking devices by adding one of the plurality of tracking devices to the list of connected tracking devices and for each of the plurality of tracking devices added to the list of connected tracking devices, recursively, determining, from the list of adjacent devices for that tracking device, a subcollection of tracking devices adjacent to that tracking device that are missing from the list of connected tracking devices, and adding each of the subcollection to the list of connected tracking devices. In some embodiments, determining that the one of the tracking devices in the subset is not part of the group associated with the multi-unit vehicle may further comprise determining that none of the tracking devices in the group associated with the multi-unit vehicle are in the generated list of connected tracking devices.

The generated list of connected devices may also be used to select a new master device. For example, the server may determine that none of the tracking devices in the list of connected tracking devices have been selected as a master prior to selecting the new master device. In another example, the server may select the tracking device in the list with the longest expected remaining battery life to be the new master device for the tracking devices in the list.

In the embodiment shown in FIG. 6C, the server starts generating the list by adding the second tracking device to the list of connected tracking devices. The server then traverses the list of adjacent devices for the third tracking device (FIG. 6B) and adds the first tracking device to the list of connected tracking devices. While not explicitly illustrated in FIG. 6C, following the addition of the first tracking device to the list of connected tracking devices, the server may traverse the list of adjacent devices for the first tracking device and not add any tracking devices to the list of connected tracking devices because the second tracking device is already accounted for. The server may determine that the second tracking device is no longer part of the group associated with the multi-unit vehicle (i.e. the group comprising the third, fourth, and fifth tracking device) because the third to fifth tracking devices are not in the list of connected tracking devices for the second tracking device.

While FIG. 6C illustrates beginning the process of generating the list of connected tracking devices by adding the second tracking device to the list, the process may begin by adding any other tracking device such as the first tracking device.

While FIG. 6C illustrates a depth-first-search implementation for generating the list of connected tracking devices, in other embodiments, the server may use other types of graph traversal algorithms, such as breadth-first-search, to implement the generation of the list of connected tracking devices.

Figure 7:
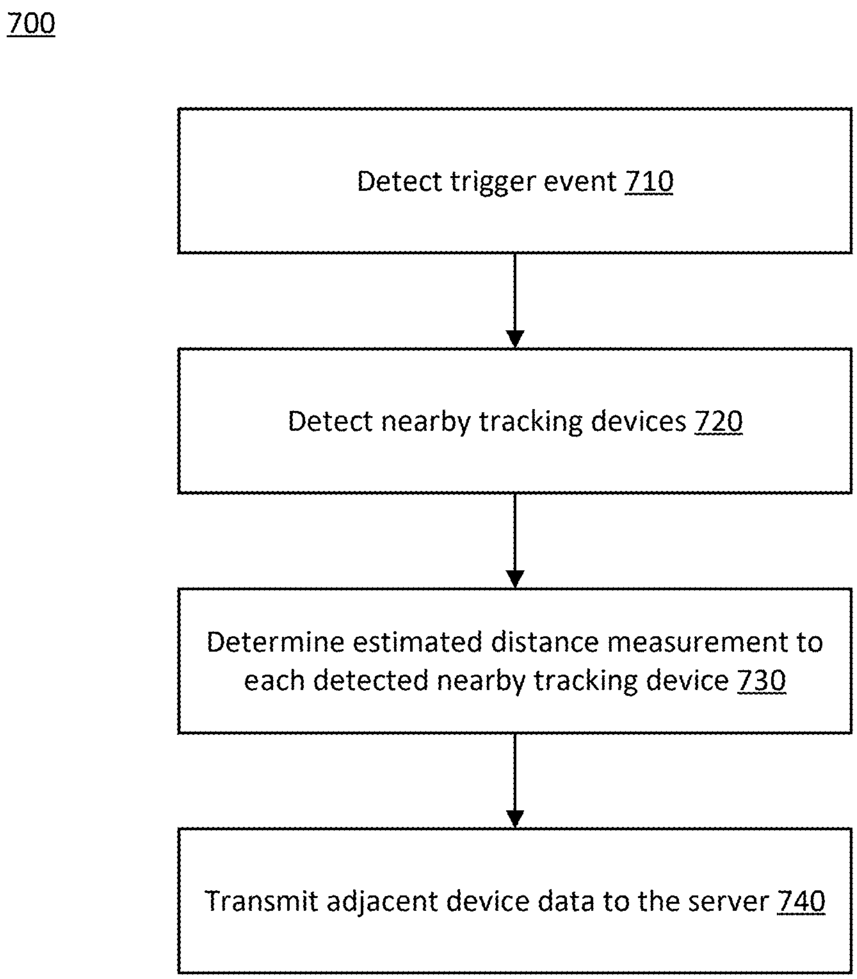
FIG. 7 illustrates a flowchart of a general method of sending adjacent device data from a tracking device to the server.

Reference is now made to FIG. 7 illustrating a simplified example method 700 of causing a tracking device to transmit adjacent device data to a server. The method 700 may be implemented by way of software instructions executed by one or more processors, such as the controller 208 of the tracking device 104 (FIG. 2). The tracking device that implements the method 700 includes at least a processor, a memory, a cellular transceiver, a global satellite navigation system chip, and a short-range communications chip. The method 700 may be executed prior to or in conjunction with the method 300 (FIG. 3) or the method 500 (FIG. 5).

In operation 710, the tracking device detects a trigger event. The trigger event may be a change in acceleration or velocity. A change in acceleration may correspond to a rail car beginning to move after being stopped or idle. Additionally or alternatively, the change in acceleration may correspond to a rail car stopping after moving for a while. In another example, the change in acceleration may correspond to the linking or unlinking of rail cars. Additionally or alternatively, the trigger event may be an elapse in time. For example, the tracking device may be configured to periodically initiate execution of the method 700.

In operation 720, the tracking device, in response to detecting the trigger event, detects one or more nearby by tracking devices. The tracking device may use a short-range wireless system to detect the one or more detected nearby tracking devices. The short-range wireless system may use SRF, BLE, or Bluetooth™, for example.

In operation 730, the tracking device determines the estimated distance measurement to each detected nearby tracking device using the short-range wireless system. For example, a first tracking device may determine that it is approximately 15 meters away from a second tracking device and approximately 20 meters away from a third tracking device.

In some embodiments, the tracking device estimates distance to each nearby tracking device based on signal strength received from the nearby tracking devices via the short-range wireless system. For example, if a first tracking device receives a stronger signal from a second tracking device than a third tracking device, the first tracking device may determine that it is closer to the second tracking device than to the third tracking device.

In operation 740, the tracking device may transmit adjacent device data to the server. The adjacent device data may include data regarding the detected nearby tracking devices and the estimated distance measurements to the nearby tracking devices. The tracking device may also transmit other data such as acceleration and velocity data relating to the tracking device.

Figure 8:
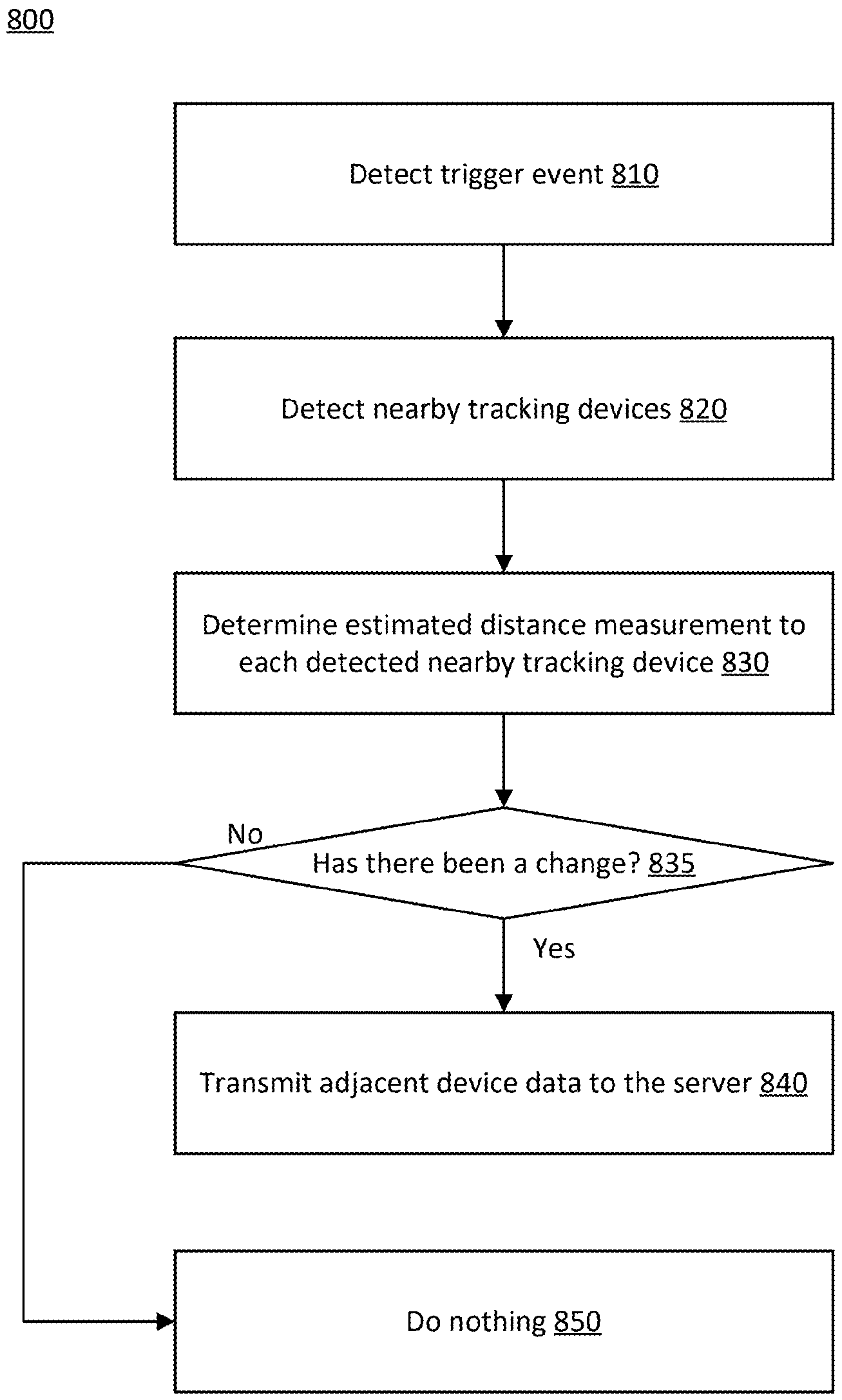
FIG. 8 illustrates a flowchart of another general method of sending adjacent device data from a tracking device to the server.

Reference is now made to FIG. 8 illustrating an alternative example method 800 of causing a tracking device to transmit adjacent device data to a server. The method 800 may be implemented by way of software instructions executed by one or more processors, such as the controller 208 of the tracking device 104 (FIG. 2). The tracking device that implements the method 800 includes at least a processor, a memory, a cellular transceiver, a global satellite navigation system chip, and a short-range communications chip. The method 800 may be executed prior to or in conjunction with the method 300 (FIG. 3) or the method 500 (FIG. 5).

In operation 810, the tracking device detects a trigger event. The trigger event may be a change in acceleration or velocity. A change in acceleration may correspond to a rail car beginning to move after being stopped or idle. Additionally or alternatively, the change in acceleration may correspond to a rail car stopping after moving for a while. In another example, the change in acceleration may correspond to the linking or unlinking of rail cars. Additionally or alternatively, the trigger event may be an elapse in time. For example, the tracking device may be configured to periodically initiate execution of the method 800.

In operation 820, the tracking device, in response to detecting the trigger event, detects one or more nearby by tracking devices. The tracking device may use a short-range wireless system to detect the one or more detected nearby tracking devices. The short-range wireless system may use SRF, BLE, or Bluetooth™, for example.

In operation 830, the tracking device determines the estimated distance measurement to each detected nearby tracking device using the short-range wireless system. For example, a first tracking device may determine that it is approximately 15 meters away from a second tracking device and approximately 20 meters away from a third tracking device.

In some embodiments, the tracking device estimates distance to each nearby tracking device based on signal strength received from the nearby tracking devices via the short-range wireless system. For example, if a first tracking device receives a stronger signal from a second tracking device than a third tracking device, the first tracking device may determine that it is closer to the second tracking device than to the third tracking device.

In decision 835, the tracking device determines if there has been a change in data. A change may be, for example, that a formerly nearby tracking device is no longer nearby. In the alternative, a change may be that there is a nearby tracking device that was not nearby before. In another example, a change may be that a tracking device that was 25 meters away is now 15 meters away. Alternatively, a change may be that a tracking device that was 25 meters away is now 15 meters away.

If the tracking device determines that there was a change, flow control proceeds to operation 840. In the operation 840, the tracking device may transmit adjacent device data to the server. The adjacent device data may include data regarding the detected nearby tracking devices and the estimated distance measurements to the nearby tracking devices. The tracking device may also transmit other data such as acceleration and velocity data relating to the tracking device.

Alternatively, if the tracking device determines, at the decision 835, that there was no change, flow control proceeds to operation 850. In the operation 850, the tracking device does not transmit adjacent device data to the server. Refraining from transmitting adjacent device data to the server may allow the tracking device to extend its battery life. It may also prevent network congestion on the network connecting the server to the plurality of tracking devices.

Figure 9:
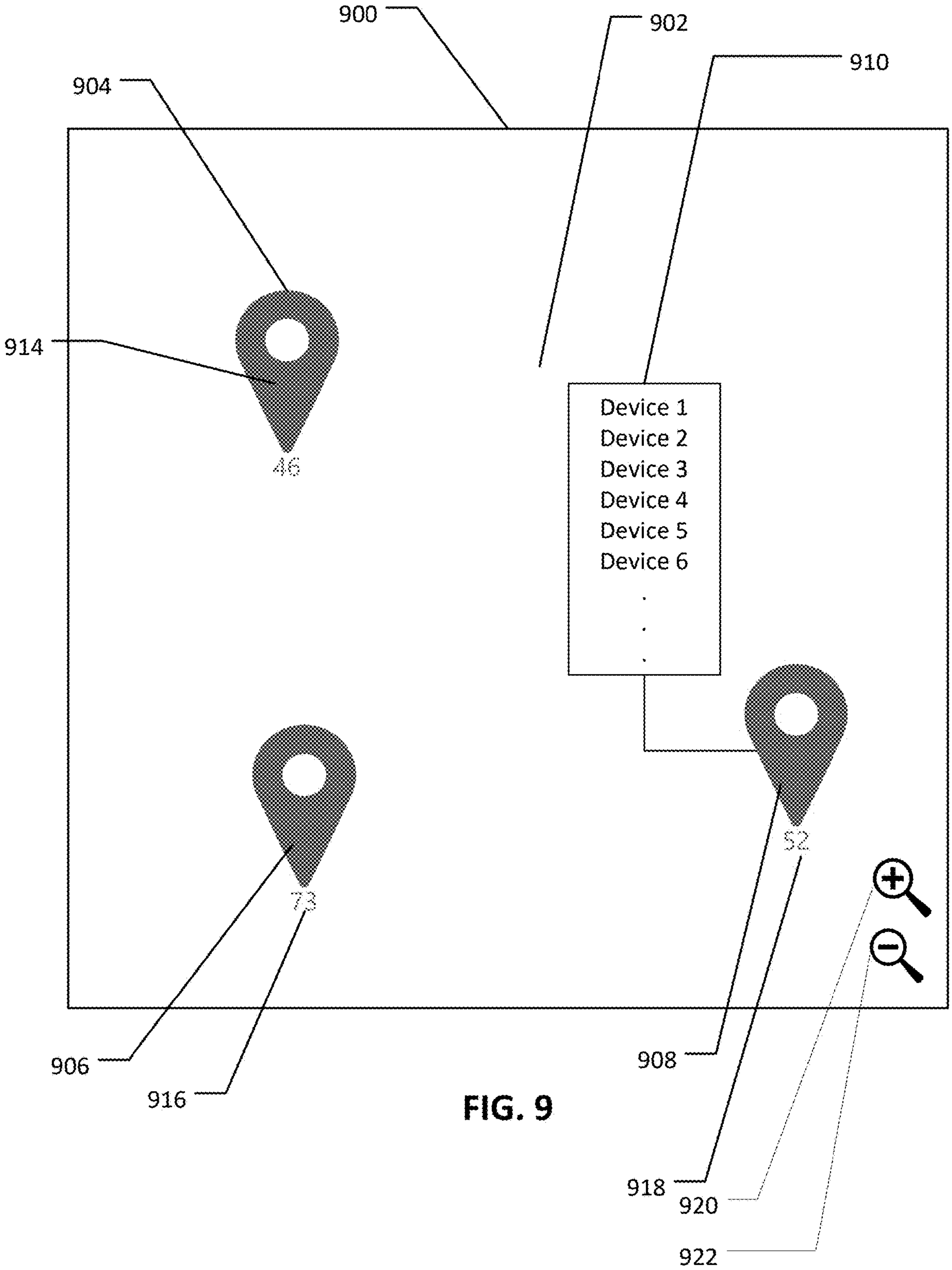
FIG. 9 illustrates a simple diagram of a dashboard showing the locations of different multi-unit vehicles that are being tracked.

References is now made to FIG. 9 illustrates a simple diagram of a dashboard 900 showing the locations of different multi-unit vehicles that are being tracked. The dashboard 900 may be shown on the display of a computer such as user device 110 (FIG. 1). The computer may be in communication with a server such as the server 102 (FIG. 1). The computing device showing the dashboard 900 includes, at least, a processor, a memory, a network interface, an input interface, and an output interface.

FIG. 9 shows a background 902. The background 902 may be a map. The map may be scrollable. That is, a user or viewer may be able to see different areas of the map by clicking and dragging with a cursor, dragging with a finger, or using arrow keys. The dashboard may also have a zoom-in and zoom-out feature. For example, the dashboard 900 has a zoom-in icon 920 and a zoom-out icon 922. Clicking on the zoom-in icon 920 with a cursor allows a user to see a smaller area of the map in more detail. Clicking on the zoom-out icon 922 with a cursor allows a user to see a larger area of the map at the expense of detail. While FIG. 9 shows clickable icons that allow a user to zoom-in and zoom-out of the map, the dashboard may implement zoom-in and zoom-out features in other ways. For example, a user may, on a touchscreen, use an expanding motion with their fingers to zoom-in and a contracting motion with their fingers to zoom-out. Alternatively, pressing the up key of a computer keyboard may result in a zoom-in and pressing the down key may result in a zoom-out.

FIG. 9 shows location icons 904, 906, and 908. The location icons 904, 906, and 908 represent the location of multi-unit vehicles being tracked by the plurality of tracking devices. Specifically, the location icons 904, 906, and 908 correspond to the location of the master devices. In FIG. 9, the location icons 904, 906, and 908 are reverse tear-shaped however, other shapes may also be used. For example, a train icon may be used instead of a reverse tear-shaped icon.

FIG. 9 also shows numerals 914, 916, and 918 underneath the location icons 904, 906, and 908 respectively. The numerals 914, 916, and 918 indicate the number of tracking devices at the locations indicated by the location icons 904, 906, and 908. In other words, the numerals "46", "73", and "52" indicated by reference numerals 914, 916, and 918 may indicate the number of tracking devices associated with the multi-unit vehicles at the locations indicated by the location icons 904, 906, and 908. In some embodiments, the numerals 914, 916, and 918 may correspond to a number of shipping containers in a group of shipping containers being tracked. In other embodiments, the numerals 914, 916, and 918 may correspond to a number of rail cars in trains. While FIG. 9 shows the numerals 914, 916, and 918 underneath the location icons 904, 906, and 908, other embodiments may have the numeral in a difference placement relative to the location icons. For example, the numerals may be placed inside the location icons. In another embodiment, the numerals may be placed on top of or beside the location icons.

FIG. 9 also shows a window 910 associated with the location icon 908. Each location icon may have a window associated with it. The windows may be hidden by default. The window icon may be triggered to appear. For example, the window 910 may appear by hovering a cursor over the location icon 908. In another embodiment, the window 910 may appear by clicking on the location icon 908 with a cursor. In another embodiment, the window 910 may appear by tapping the location icon 909 in the case that the dashboard 900 is displayed on a touchscreen.

The window 910 is depicted to show a list of tracking devices associated with the multi-unit vehicle at the location indicated by the location icon 908. If the object that the tracking devices are already known (for example, a rail chassis, a rail car, or a container), the window 910 may instead show a list of corresponding objects that the tracking devices are installed on. In some embodiments, the list may be truncated due to spatial constraints. In such a case, there may be an operation that can expand the truncated list. For example, hovering or clicking on the window 910 with a cursor may expand the list shown in the window. Alternatively, hovering or clicking on the window 910 may result in an overlay being displayed over the dashboard, the overlay listing all of the tracking devices at the location or the objects the tracking devices are installed on or associated with at the location.

In some embodiments, a user may be able to interact with the list of tracking devices associated with the multi-unit vehicle. For example, clicking, with a cursor, on a specific listed device or object associated with a device may result in an overlay describing statistics and statuses pertaining to that device or object. The described statistics or statuses may include battery life, time in transit, type of transportation, goods being carried, hazardousness if the goods being carried, fragility of the goods being carried, health and maintenance statistics of the transportation medium (e.g. rail car, chassis), etc.

Figure 10:
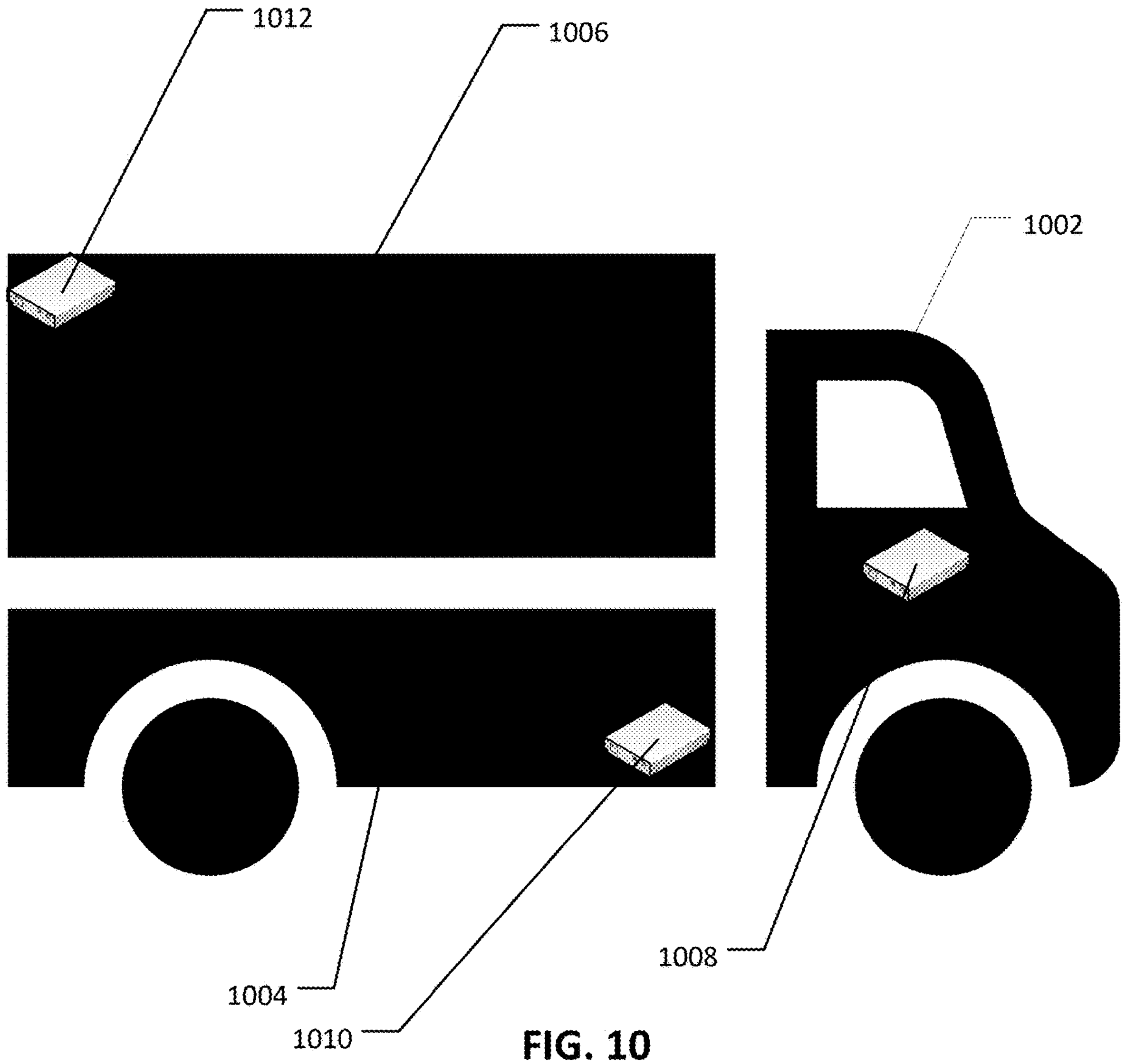
FIG. 10 illustrates another embodiment wherein the tracking devices are associated with a truck, chassis, and container road vehicle.

Reference is now made to FIG. 10 illustrating another embodiment wherein the tracking devices are associated with a truck, chassis, and container road vehicle. FIG. 10 shows a transportation unit, the transportation unit comprising a truck or tractor 1002, a chassis 1004, and a container 1006. Each of the truck or tractor 1002, chassis 1004, and container 1006 have installed on or associated with them, respectively, tracking devices 1008, 1010, and 1012. Each of the tracking devices 1008, 1010, and 1012 may be the tracking device 104 (FIG. 1).

The above discussed embodiments are considered to be illustrative and not restrictive. Certain adaptations and modifications of the described embodiments may be made. All such modification, permutations and combinations are intended to fall within the scope of the present disclosure.

What is claimed is:

1. A method for tracking assets, the method comprising:
receiving at a server, via wireless communication, from each of a plurality of tracking devices, adjacent device data for that tracking device regarding one or more detected nearby tracking devices and an estimated distance measurement to each detected nearby tracking device;
determining from the adjacent device data that a subset of the plurality of tracking devices are in a group associated with a multi-unit vehicle;
selecting at least one of the tracking devices in the subset as a master device; and
transmitting, via wireless communication, instructions to the subset of tracking devices designating the at least one of the tracking devices as the master device and other tracking devices in the subset as slave devices, wherein the master device is to send location data to the server via its wireless data connection, and wherein the slave devices are to forego sending communications to the server via their respective wireless data connections.

2. The method of claim 1 further comprising maintaining, for each of the plurality of tracking devices, a list of adjacent devices, and in response to receiving the adjacent device data for that tracking device:
determining a subgroup of the one or more nearby tracking devices for that tracking device wherein each of the subgroup has an acceleration that is within an allowed deviation of an acceleration of that tracking device and each of the subgroup are not in the list of adjacent devices for that tracking device;
adding each of the subgroup to the list of adjacent devices for that tracking device; and
adding that tracking device to the list of adjacent devices for each of the subgroup.

3. The method of claim 2 wherein determining from the adjacent device data that the subset of the plurality of tracking devices are in the group further comprises generating a list of connected tracking devices by adding one of the plurality of tracking devices to the list of connected tracking devices and for each of the plurality of tracking devices added to the list of connected tracking devices, recursively:
determining, from the list of adjacent devices for that tracking device, a subcollection of tracking devices adjacent to that tracking device that are missing from the list of connected tracking devices; and
adding each of the subcollection to the list of connected tracking devices.

4. The method of claim 2 further comprising:
receiving at the server, subsequent to the transmitting, via wireless communication, from each of the plurality of tracking devices, updated adjacent device data for that tracking device regarding one or more detected nearby tracking devices and an updated estimated distance measurement to each detected nearby tracking device;
determining from the updated adjacent device data that one of the tracking devices in the subset is not part of the group associated with the multi-unit vehicle;
selecting a new master device for the one of the tracking devices; and
transmitting, via wireless communication, instructions to the new master device wherein the new master device is to send location data to the server via its wireless data connection.

5. The method of claim 4 further comprising, for each of the plurality of tracking devices, in response to receiving the updated adjacent device data for that tracking device:
determining that one of the tracking devices in the list of adjacent devices for that tracking device has an acceleration beyond the allowed deviation of the acceleration of that tracking device; and responsive thereto,
removing the one in the list of adjacent devices for that tracking device from the list of adjacent devices for that tracking device; and
removing that tracking device from the list of adjacent devices for the one in the list of adjacent devices for that tracking device.

6. The method of claim 5 wherein determining that the one of the tracking devices in the subset is not part of the group associated with the multi-unit vehicle further comprises:
generating a list of connected tracking devices by adding one of the plurality of tracking devices to the list of connected tracking devices and for each of the plurality of tracking devices added to the list of connected tracking devices, recursively:
determining, from the list of adjacent devices for that tracking device, a subcollection of tracking devices adjacent to that tracking device that are missing from the list of connected tracking devices; and
adding each of the subcollection to the list of connected tracking devices; and
determining that none of the tracking devices in the group associated with the multi-unit vehicle are in the list of connected tracking devices.

7. The method of claim 6 wherein selecting the one of the tracking devices as the new master device further comprises determining that none of the tracking devices in the list of connected tracking devices have been selected as the master.

8. The method of claim 4 further comprising, prior to the receiving at the server, at one or more of the tracking devices in the subset:
detecting a trigger event;
in response to detecting the trigger event, using a short-range wireless system to detect the one or more detected nearby tracking devices for that tracking device; and
determining the estimated distance measurement to each detected nearby tracking device using the short-range wireless system.

9. The method of claim 8 wherein the trigger event is a change in acceleration.

10. The method of claim 8 wherein the trigger event is an elapse in time.

11. The method of claim 1 wherein:

each of the plurality of tracking devices have a battery and a corresponding battery life; and the master device is selected based on the battery lives of the tracking devices in the subset of the plurality of tracking devices.

12. The method of claim 1 further comprising determining an order of the tracking devices in the subset based on the estimated distance measurements to each detected nearby tracking device for each of the tracking devices in the subset.

13. A server for tracking assets, the server being coupled to a wireless communication system and comprising:

a processor;

a memory storing processor-executable instructions that, when executed, are to cause the processor to:

receive at a server, via wireless communication, from each of a plurality of tracking devices, adjacent device data for that tracking device regarding one or more detected nearby tracking devices and an estimated distance measurement to each detected nearby tracking device;

determine from the adjacent device data that a subset of the plurality of tracking devices are in a group associated with a multi-unit vehicle;

select at least one of the tracking devices in the subset as a master device; and transmit, via wireless communication, instructions to the subset of tracking devices designating the at least one of the tracking devices as the master device and other tracking devices in the subset as slave devices, wherein the master device is to send location data to the server via its wireless data connection, and wherein the slave devices are to forego sending communications to the server via their respective wireless data connections.

14. The server of claim 13 wherein the server maintains, for each of the plurality of tracking devices, a list of adjacent devices, and in response to receiving the adjacent device data for that tracking device, the server:

determines a subgroup of the one or more nearby tracking devices for that tracking device wherein each of the subgroup has an acceleration that is within an allowed deviation of an acceleration of that tracking device and each of the subgroup are not in the list of adjacent devices for that tracking device;

adds each of the subgroup to the list of adjacent devices for that tracking device; and adds that tracking device to the list of adjacent devices for each of the subgroup.

15. The server of claim 14 wherein the server:

receives, subsequent to the transmitting, via wireless communication, from each of the plurality of tracking devices, updated adjacent device data for that tracking device regarding one or more detected nearby tracking devices and an updated estimated distance measurement to each detected nearby tracking device;

determines from the updated adjacent device data that one of the tracking devices in the subset is not part of the group associated with the multi-unit vehicle;

selects the one of the tracking devices as a new master device; and transmits, via wireless communication, instructions to the one of the tracking devices designating the one as the new master device and, wherein the new master device is to send location data to the server via its wireless data connection.

16. The server of claim 15 wherein in for each of the plurality of tracking devices, in response to receiving the updated adjacent device data for that tracking device, the server:

determines that one of the tracking devices in the list of adjacent devices for that tracking device has an acceleration beyond the allowed deviation of the acceleration of that tracking device; and responsive thereto, removes the one in the list of adjacent devices for that tracking device from the list of adjacent devices for that tracking device; and removes that tracking device from the list of adjacent devices for the one in the list of adjacent devices for that tracking device.

17. The server of claim 15 wherein prior to the receiving at the server, one or more of the tracking devices in the subset:

detect a trigger event;

in response to detecting the trigger event, use a short-range wireless system to detect the one or more detected nearby tracking devices for that tracking device; and determine the estimated distance measurement to each detected nearby tracking device using the short-range wireless system.

18. The server of claim 17 wherein the trigger event is a change in acceleration.

19. The server of claim 13 wherein:

each of the plurality of tracking devices have a battery and a corresponding battery life; and the master device is selected based on the battery lives of the tracking devices in the subset of the plurality of tracking devices.

20. A non-transitory computer-readable medium, storing processor-executable instructions to:

receive at a server, via wireless communication, from each of a plurality of tracking devices, adjacent device data for that tracking device regarding one or more detected nearby tracking devices and an estimated distance measurement to each detected nearby tracking device;

determine from the adjacent device data that a subset of the plurality of tracking devices are in a group associated with a multi-unit vehicle;

select at least one of the tracking devices in the subset as a master device; and transmit, via wireless communication, instructions to the subset of tracking devices designating the at least one of the tracking devices as the master device and other tracking devices in the subset as slave devices, wherein the master device is to send location data to the server via its wireless data connection, and wherein the slave devices are to forego sending communications to the server via their respective wireless data connections.

* * * * *